Figure 1:
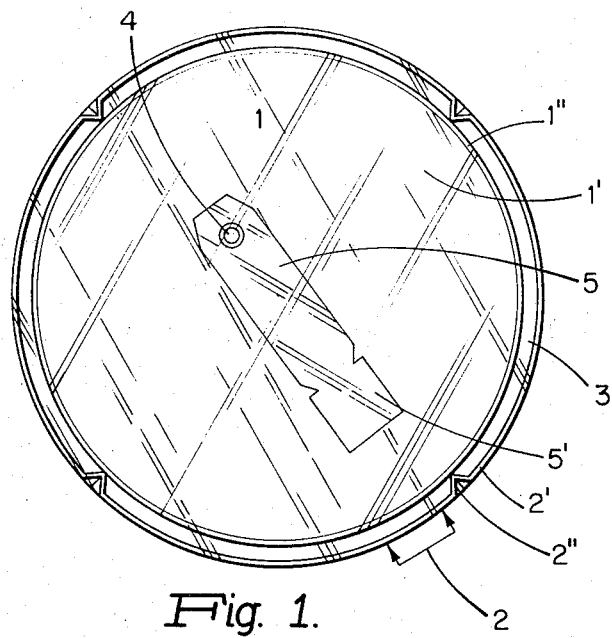

United States Patent [19]
Swanson et al.

[11] 3,769,936
[45] Nov. 6, 1973

[54] ORGANISM GROWTH CHAMBER AND PROCESS

[76] Inventors: H. Damon Swanson; Glenda A. Swanson, both of Star Rt. 78, Plastow, N.H.

[22] Filed: Aug. 9, 1971

[21] Appl. No.: 170,252

[52] U.S. Cl. .................. 119/15, 119/1, 195/139, 215/73
[51] Int. Cl. ................ A01k 01/00, C12k 01/10
[58] Field of Search ............... 119/15, 17; 128/1 R, 128/273; 195/103.5, 139; 215/73

[56] References Cited
UNITED STATES PATENTS

| 1,515,016 | 11/1924 | Earp-Thomas | 195/139 UX |
| 2,701,229 | 2/1955 | Scherr | 195/139 |
| 3,158,553 | 11/1964 | Carski | 195/139 |

Primary Examiner—Hugh R. Chamblee
Attorney—David Rines et al.

[57] ABSTRACT

This disclosure deals with a novel organism growth chamber for such uses as the observation of *Drosophila melanogaster* genetic studies and the like embodying a flat transparent cover for a Petri-type dish provided with an externally communicating orifice that may be readily opened and closed for communication between the exterior and the interior of the covered dish without affecting the activity or observation within the same.

6 Claims, 2 Drawing Figures

PATENTED NOV 6 1973 3,769,936

ORGANISM GROWTH CHAMBER AND PROCESS

The present invention relates to an organism growth chamber and process, being more particularly directed to chambers in which it is desired to observe genetic phenomena in situ. For many decades, the experimental procedures and apparatus employed to study the genetic phenomena associated with the growth of organisms have left a great deal to be desired in terms of tracing growth patterns, life cycles and the various stages and phases of growth and development, because of the inherent limitations in the chambers in which the growth phenomena occurred and the previous necessity for removing organisms and other material from the chamber for microscopic examination.

Some of the problems of the lack of facility in the observation and study of, for example, the growth pattern and life cycle stages of the fruit fly, *Drosophila melanogaster*, (an extremely important multi-cellular eucaryote organism for genetics research) is described, for example, in Science, Vol. 170, pages 695 through 706, 1970, by D. T. Suzuki in an article entitled "Temperature-Sensitive Mutations in *Drosophila melanogaster*." One of the conventional ways of conducting these studies has been to place the Drosophila in a small pint-sized milk bottle or chamber in which a growth medium has been inserted, such as corn meal and molasses, as described, for example, by M. Demerec and B. P. Kaufman in Drosophila Guide, Carnegie Institute of Washington, p. 45, 1967. A gauze or similar temporary stopper is inserted in the mouth of the container and the organisms are permitted to grow under various conditions. When anesthesia is desired, the gauze or other stopper is removed and the anesthetic gas or fluid or other treating substance is introduced. Alternatively, an anesthetizing chamber may be placed over the mouth of the growth chamber to trap and retain the adult flies. In either case the very act of removing the gauze or other stopper carries with it the disadvantage that some of the flies or other organisms escape; and this reduces the accuracy of counts and other observations. In addition, when it is desired to study the various portions of the life cycles including recognition of mutants as they emerge from the pupa stage and other growth phenomena, it is again necessary to remove the gauze or other stopper to try to obtain specimens for microscopic study. While cultures have for many years been grown in Petri-type dishes, such as those described, for example, in Will Scientific, Inc. Catalog No. 10, Laboratory Equipment, Supplies and Chemicals, Rand, McNally and Company, 1969, pages 314 through 320, the uses of these dishes has been confined largely to the study of cultures, biological specimen, antibiotic assaying, bacteria and other counting and similar purposes, and have not heretofore seemed adapted for such purposes as breeding fruit flies and similar organisms which for many decades had been considered to require much larger chambers, such as the before-mentioned milk bottles. In accordance with the present invention, however, it has been discovered that fruit flies and similar organisms may be successfully maintained and studied in properly modified small chambers; specifically, in chambers embodying Petri-type dishes that are adapted for microscopic study without the necessity for removing the cover either to enable the introduction of material or to remove samples for external microscopic examination.

It is to this discovery and the provision of a suitable small chamber embodying a Petri-type dish appropriately modified, that the present invention, in summary is primarily directed.

It is thus a primary object of the present invention to provide a new and improved organism growth chamber that is particularly adapted for the generation and study of *Drosophila melanogaster* and other similar organisms and that shall not be subject to the before-mentioned disadvantages and limitations of prior art chambers and techniques.

A further object is to provide a novel organism growth chamber and technique or process that is of more general application, as well.

Other and further objects will be explained hereinafter and are more particularly pointed out in the appended claims.

Figure 2:
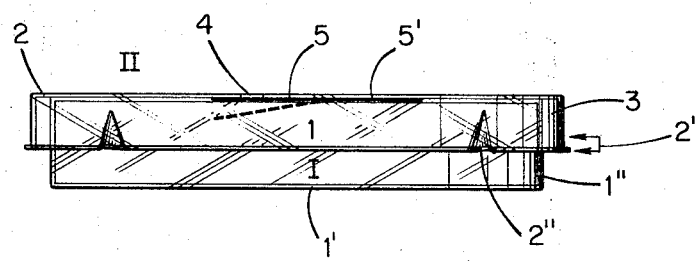

The invention will now be described with reference to the accompanying drawing,

FIG. 1 of which is a bottom elevation illustrating an assembled chamber constructed in accordance with a preferred embodiment of the invention, and FIG. 2 is a side elevation of the same.

Referring to FIG. 1, a conventional Petri-type dish is shown generally at 1, having a flat circular base 1' with conventional cylindrical side walls extending upwardly therefrom at 1''. A cover for the open top of the dish 1 is provided with downwardly depending cylindrical side walls 2' corresponding to the side walls 1'' of the dish 1 and overlapping the same in spaced relation to define a channel 3 therebetween. If all of the parts before-mentioned are transparent, as of glass or polystyrene plastic, a visual observation can be made of all portions of the chamber defined by the dish 1 covered by the lid 2. The growth medium, such as that described by Demerec et al, before-mentioned, will be poured into a sterile dish 1 and allowed to solidify at I. In accordance with the invention, a small orifice 4 is provided in the transparent lid 1 which will enable communication between the interior and exterior of the covered dish as for the purpose of introducing a fluid or gaseous anesthetic or other materials to affect the environment being observed, but without the necessity for removing the lid. The orifice may be of small needle-size merely to enable the introduction of a syringe, as later discussed. It is preferably small compared to any organism or substances that might escape from the chamber; and it occupies a miniscule point or region of the transparent lid 2 above which a microscope (either operated by a human observer or automatically monitored by moving picture cameras or other monitoring devices) is positionable.

The orifice 4 will normally be kept covered as by a resilient tape strip 5, such as a transparent strip of resilient plastic (for example, thin cellulose acetate or the like), shown secured (as, for example, by rubber cement or other well-known means) at one end portion 5' to the inner surface of the lid 2 and extending along the inner surface normally to cover the orfice 4 at the other end portion thereof. When it is desired to permit communication into the interior, it is merely necessary to insert the needle or other probe associated with the anesthetic or other material to be introduced through the orifice 4, downwardly to depress the free-end of the resilient strip 5, as shown in dotted lines in FIG. 2. Following the introduction of the desired substance and the removal of the introducing probe or other mechanism, the resilient strip 5 will spring back to cover the orifice 4.

Since, unlike conventional Petri-type dishes, the lid 2 does not have to be removed except at the end of the experiment and since it is preferred, indeed, for microscopic monitoring and other purposes that the closed chamber remain with its parts in fixed relative position, a lid-securing means is provided, shown in the form of the angular indentations or notches 2" which extend from the side walls 2' across the channel 3 and resiliently contact the side walls 1" of the dish 1.

Through the use of the above construction, it has been found possible to conduct in situ observations of behaviour and genetic effects on such organisms as *Drosophila melanogaster*, reducing the manipulative and other difficulties before-discussed that have long plagued the researcher, and providing for the first time insights and observations in the genetics that have not been observable heretofore in their totality with the previous techniques and apparatus employed in this art.

Through the use of the flat and transparent lid 2 and base 1', microscopic examination can be effected with light reflected from the top or introduced at the sides or through the base of the dish and the culture medium, enabling in situ monitoring with various different light contrasts that give rise to continuous observations during the life cycles of such organisms not heretofore attained. The invention thus permits in situ studies on a continual basis of Mendelian genetics, population genetics, and behavioural genetics. It permits the observation of where the eggs are laid and hatched, of larval migration and the location of pupation, which are all impossible with milk bottle-type techniques.

As an illustration, with a 100 mm by 15–20 mm Petri-type dish containing 20 ml of the before-mentioned growth medium, it was found possible to observe growth cycles at room temperature with the system lasting for 6 to 8 weeks before dehydration set in and disposal of the materials was required. In view of the inexpensive nature of the structure of the present invention, the necessity for washing out the milk bottle or similar chambers for reuse has been eliminated; the apparatus of the present invention being, indeed, disposable.

An orifice 4 of 3 mm in diameter was found entirely satisfactory for such purposes as the introduction of carbon dioxide anesthetic. In situ observations were continuously conducted with a dual illuminated stereoscopic microscope positioned to receive the chamber in its field of view, and at no time was it necessary to disturb the culture. The use of this apparatus and technique permitted immediate recognition of mutant flies as they emerged from the pupa stage, resulting in a large retrieval of mutants that might otherwise have senesced if maintained under the experimental conditions, as in the prior art techniques. It was also found possible readily to obtain a synchronous growth pattern of the flies by segregation of life cycle phases. Where desired, these may be further studied on separate culture plates. The structure enabled the direct observation of the growth environment under the microscope while permitting manipulation of the life cycle stages. Mutagens, for example, were added at various stages with subsequent observation of behavioural patterns and phenotypic changes without the before-mentioned difficulties and inaccuracies of previous systems.

While preferrd detachable tab-covered and notch lid-locking mechanisms have been described, it will be readily evident to those skilled in the art that other types of detachable devices, tapes and the like may readily be employed; all such being considered to fall within the spirit and scope of the invention as defined in the appended claims.

What is claimed is:

1. An organism growth chamber having, in combination, an open-top transparent Petri-type dish having bottom and side walls, a transparent lid for covering the dish having depending side walls external and corresponding to the dish side walls and spaced therefrom to define a channel therebetween, the lid having a small orifice for enabling communication between the interior and exterior of the covered dish, and tab means adhered upon the lid near the orifice and provided with means for detachably maintaining the tab means as a cover over the orifice.

2. An organism growth chamber as claimed in claim 1 and in which the said tab means comprises a resilient strip disposed along the inner wall of the lid and secured at a point thereof remote from the orifice such that downward pressure through the orifice enables the resilient depressing of the portion of the strip covering the orifice to permit external communication with the interior of the dish.

3. An organism growth chamber as claimed in claim 2 and in which said tab means is transparent.

4. An organism growth chamber as claimed in claim 2 and in which means is provided at the said side walls for detachably securing the lid to the dish.

5. An organism growth chamber as claimed in claim 4 and in which said securing means comprise notch means provided in the lid side walls and extending across said channel to the dish side walls.

6. A process for the manipulation and study of the growth of organisms such as *Drosophila melanogaster* and the like, that comprises, disposing a growth medium for the organisms in the base of flat-lid covered transparent chamber, inserting the organisms within the chamber, monitoring the growth through the lid, and opening a small orifice only in the lid to introduce substances into the chamber and closing the same while continuing the monitoring through the lid uninterrupted.

* * * * *